United States Patent [19]

Schretzmann et al.

[11] 4,407,774

[45] Oct. 4, 1983

[54] METHOD FOR PREVENTING DANGEROUS HYDROGEN ACCUMULATION IN NUCLEAR REACTOR CONTAINMENTS

[75] Inventors: Klaus Schretzmann, Karlsruhe; Stefan Dorner, Pforzheim; Gustav Schumacher, Karlsruhe, all of Fed. Rep. of Germany

[73] Assignee: Kernforschungszentrum Karlsruhe G.m.b.H., Karlsruhe, Fed. Rep. of Germany

[21] Appl. No.: 816,181

[22] Filed: Jul. 15, 1977

[30] Foreign Application Priority Data

Jul. 23, 1976 [DE] Fed. Rep. of Germany ..... 26331135

[51] Int. Cl.$^3$ .............................................. G21C 9/00
[52] U.S. Cl. .................................. 376/300; 376/279; 376/293; 376/301
[58] Field of Search ..................... 176/37, 38, DIG. 5; 423/428; 376/300, 301, 279, 293

[56] References Cited

U.S. PATENT DOCUMENTS

| | | | |
|---|---|---|---|
| 3,158,546 | 11/1964 | Cordova | 176/37 |
| 3,658,485 | 4/1972 | Gramer | 176/37 |
| 3,658,996 | 4/1972 | Frumerman | 176/37 |
| 3,819,476 | 6/1974 | Pocock | 176/38 |
| 3,993,540 | 11/1976 | Longton et al. | 176/37 |
| 4,139,603 | 2/1979 | Weems | 176/37 |

FOREIGN PATENT DOCUMENTS 908456  6/1979  United Kingdom ......... 176/DIG. 5

OTHER PUBLICATIONS

Lyons, John W., *The Chemistry and Uses of Fire Retardants*, New York: John Wiley and Sons, 1970, p. 17.
Scott, G., *Atmospheric Oxidation and Antioxidation*, Amsterdam: Elsvies Publishing Co., 1965, ch. 4.

*Primary Examiner*—Richard E. Schafer
*Assistant Examiner*—Daniel Wasil

[57] ABSTRACT

In a method for the controlled removal of hydrogen released into the chambers of a nuclear reactor containment after a break of the primary cooling system, the hydrogen is contacted with an oxygen providing material stored in the containment which causes recombination of the hydrogen to $H_2O$ in a controlled manner at least until the amount of the gas within the hydrogen chamber is below the ignition limit of a hydrogen oxygen gas mixture.

8 Claims, No Drawings

METHOD FOR PREVENTING DANGEROUS HYDROGEN ACCUMULATION IN NUCLEAR REACTOR CONTAINMENTS

FIELD OF THE INVENTION AND DESCRIPTION OF PRIOR ART

During the operation of water cooled nuclear reactors hydrogen is constantly generated by radiolysis and hydrogen so generated is recombined with oxygen in so-called recombiners which usually include catalysts. The catalysts normally include a ceramic base material with an activating but chemically inert metal. The catalysts operate in a temperature range of 315°–565° C.

There are also flame-type recombiners in which the hydogen is burned with oxygen after passing through a cooled, porous flame barrier. All recombiners, however, are so dimensioned that they are able to recombine essentially only the amount of hydrogen constantly generated during normal operation of a nuclear reactor.

A 1000 MWe boiling water reactor, for example, generates about 5.66 m$^3$/min. (200 cfm) waste gas. About 85 to 90% of this waste gas results from the dissociation, by radiolysis, of water to hydrogen and oxygen and 10 to 15% consists of steam and air, so-called in-leakage.

The generation of hydrogen, however, is substantially increased during a failure of the reactor cooling circuit, particularly when the fuel rod cladding is heated much above its normal temperature. In such a case the cladding material is oxidized by the surrounding steam and the hydrogen is set free. Such a chemical reaction will not only occur with claddings of zirconium alloys such as zircalloy 2 or zircalloy 4 but it would occur with all alloys feasible for use as nuclear fuel cladding materials.

A complete chemical reaction between water and all the cladding material of, for example, a 3500 MWth pressurized water reactor (such as the nuclear plant at Biblis, Germany) would generate about 1270 kg of H$_2$, that is 14000 Nm$^3$ (m$^3$ under norm conditions). But 25 to 50% of this amount will presumably be generated already before core melt-down if the reactor emergency cooling system fails. The rate at which hydrogen is generated largely depends on the temperature conditions. If a constant temperature of 1500° K. (1227° C.) is assumed the rate at which H$_2$ is generated in a nuclear reactor with 6200 m$^2$ fuel element surface (fuel element surface of Biblis-type reactors) is 887 Nm$^3$ hydrogen in 100 seconds.

The recombiner designed for normal reactor operation can, of course, not handle such amounts of hydrogen. For such large amounts of hydrogen a similarly large amount of oxygen would have to be admitted to the hydrogen recombiners in a controlled manner. These large amounts of gas would result in an increased pressure build-up which would be another source of danger. After all, it is not impossible that an explosive gas mixture is formed in one or the other chamber of the reactor containment.

One could, of course, prevent the formation of explosive gas mixtures in certain chambers of the reactor containment by keeping those chambers filled with an inert gas. But this would greatly complicate normal operation of a nuclear reactor and pressurization of the chambers would still not be prevented.

It is the principal object of the present invention to provide a method for reducing the dangers associated with accidental breaks in the primary cooling system of nuclear reactors with a water cooling system, during which accidents substantially amounts of hydrogen may be released into the reactor containment which causes an increase in pressure and may, furthermore, result in a catastrophic explosion.

SUMMARY OF THE INVENTION

A method for the controlled removal of hydrogen from the containment chambers of a water-cooled nuclear reactor into which chambers substantial amounts of the hydrogen may be released upon an accidental break in the reactor's primary cooling system wherein the hydrogen is brought into contact with an oxygen providing material stored in the containment chamber, the oxygen providing material being of such a nature as to release the oxygen for combination with the hydrogen in a controlled manner at least until the amount of the gas within the hydrogen containment is below the ignition limit of a hydrogen-oxygen gas mixture.

As oxygen providing material metal oxides or mixtures of metal oxides are used whose free formation enthalpies are smaller than that of water.

The reaction occurring in a reactor core during a temperature excursion accident, for example:

$$Zr + 2H_2O \rightarrow ZrO_2 + 2H_2$$

is completed by the process according to the present invention to a kind of a cyclic process:

$$2H_2 + 2MeO = 2Me + 2H_2O$$

(wherein Me is a metal with an oxidation number of 2) provided the metal oxide can be reduced by the hydrogen under the prevailing conditions. There is a number of suitable metal oxides:

Copper oxide appears to be especially suitable. It is known that copper oxide is reduced by H$_2$ already at 120°–200° C. to copper. But besides metal oxides which can be reduced directly to the respective metal such as CuO or CdO, higher oxides of metals may be used which can be easily reduced to lower oxides such as MnO$_2$($\rightarrow$Mn$_3$O$_4$) and Fe$_2$O$_3$($\rightarrow$FeO).

Exposing the hydrogen generated during a reactor accident to such metal oxides results in a "controlled" (non-explosive) formation of water from the hydrogen.

If the metal oxide used is CuO the amount needed is relatively small: For the reformation of 1270 kg H$_2$ (the amount that could be generated in the Biblis nuclear plant) only about 50 tons of CuO would be needed. This amount of CuO in the form of powder at a density of 6.4 g/cm$^3$, would take up a volume of only 16 m$^3$.

In order to permit good contact between the oxygen providing compound (CuO) and the hydrogen, it is necessary that the oxygen providing compound has a large surface; that is, that it is present in the form of powder. Further, during an accident the hydrogen streaming from a break should immediately be brought into contact with the oxygen providing material. To achieve this, there are several solutions possible. It is, for example, possible to surround the reactor pressure vessel and the primary cooling circuit components with a double wall structure in which CuO is contained under gas pressure. Any break in a primary circuit component (reactor pressure vessel and primary cooling circuit) would also result in a break of the surrounding double wall structure and would cause close contact between the outflowing hydrogen gas and the CuO-powder. The powder, at the same time, would act as a dry type fire extinguisher so that no dangerous explosion would occur in the particular chamber of the reactor containment in which the break occurred. It would, of course, not be necessary that the double wall structure surrounds the primary circuit components so closely that it is in direct contact with the primary circuit components.

It would also be possible to store the oxygen providing material in powder form in storage containers arranged in the various chambers of the reactor containment. Expulsion of the powder from the containers could be provided for as a result of an increase in pressure in the chambers of the containment. The storage containers could, of course, be used to accommodate chambers of various sizes. In order to achieve an immediate oxidation of the hydrogen, the oxygen providing compound should be maintained at the proper reaction temperature which is about 200° C. for CuO.

In one embodiment of the method according to the invention, an inert gas such as nitrogen, helium, argon and carbon dioxide is added to the hydrogen from a storage container when the hydrogen is brought into contact with the oxygen providing compounds. Further, an extinguishing agent may be added to the oxygen providing compound and/or the inert gas which agent has anticatalytic or reaction inhibiting effects so as to insure controlled recombination of the hydrogen.

The double wall structure surrounding the primary circuit components or the storage containers for the oxygen providing material may also be pressurized by an inert gas ($N_2$, He, Ar, $CO_2$). This would result in the release of the inert gas into the surrounding area only upon occurrence of a break and would not require such chambers to be filled with inert gas during normal operation of the reactor.

The method described herein will result in firm and slow reduction of the pressure in a reactor containment after a break in the primary cooling system of the reactor by recombining hydrogen released from the break with the readily available oxygen. The danger of hydrogen explosion is also greatly reduced since the free hydrogen is relatively rapidly consumed but in a controlled manner. The oxygen providing materials are stored in such a way that normal operation of the reactor is not disturbed.

We claim:

1. In a method for the controlled removal of large amounts of suddenly released hydrogen from the containment chambers of a nuclear reactor including a water cooling system wherein, upon occurrence of an accidental break, large amounts of such hydrogen may be released which causes an increase of gas pressure in the containment and the formation of a highly explosive hydrogen-air mixture, an oxygen providing powdered material is stored within a wall structure in the containment and is, only as a result of such accident, blown out into the containment into contact with the hydrogen in a controlled manner dependent on the amount of hydrogen accidentally released such that the hydrogen is consumed with the aid of said material in a non-explosive reaction and the amount of the hydrogen in the containment is maintained below the ignition limit of a hydrogen-oxygen gas mixture.

2. A method as recited in claim 1, wherein at least one type of metal oxide having a lower formation enthalpy than water is used as the oxygen providing material.

3. A method as recited in claim 2, wherein copper oxide (CuO) is used as the metal oxide.

4. A method as recited in claim 2, wherein manganese oxide ($MnO_2$) is used as the metal oxide.

5. A method as recited in claim 2, wherein iron (III)-oxide ($Fe_2O_3$) is used as the metal oxide.

6. A method as recited in claim 2, wherein cadmium-oxide (CdO) is used as the metal oxide.

7. A method as recited in claim 1, wherein an inert gas of the group consisting of nitrogen, helium, argon and carbon dioxide is admixed to the hydrogen while the hydrogen is contacted with the oxygen providing material.

8. A method as recited in claim 1, wherein said oxygen providing powdered material is stored under gas pressure in a wall structure within said containment.

* * * * *